United States Patent
Suzuki et al.

(10) Patent No.: US 12,502,976 B2
(45) Date of Patent: Dec. 23, 2025

(54) ELECTRIC POWER SUPPLYING MODULE

(71) Applicant: Yazaki Corporation, Tokyo (JP)

(72) Inventors: Yasuhito Suzuki, Makinohara (JP);
Takao Nogaki, Makinohara (JP);
Masatoshi Egawa, Makinohara (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 18/743,566

(22) Filed: Jun. 14, 2024

(65) Prior Publication Data

US 2025/0018804 A1 Jan. 16, 2025

(30) Foreign Application Priority Data

Jul. 14, 2023 (JP) ................... 2023-116079

(51) Int. Cl.
*B60L 15/00* (2006.01)
*B60L 50/60* (2019.01)
*B60L 58/20* (2019.01)

(52) U.S. Cl.
CPC ............ *B60L 15/007* (2013.01); *B60L 50/66* (2019.02); *B60L 58/20* (2019.02); *B60L 2210/10* (2013.01); *B60L 2210/40* (2013.01)

(58) Field of Classification Search
None
See application file for complete search history.

(56) References Cited

U.S. PATENT DOCUMENTS

| | | | |
|---|---|---|---|
| 2014/0232184 A1* | 8/2014 | Ukai | B60K 1/00 307/10.1 |
| 2017/0237379 A1* | 8/2017 | Fukazu | H02G 3/30 318/503 |
| 2019/0366957 A1 | 12/2019 | Satake | |
| 2019/0381888 A1* | 12/2019 | Ishibashi | B60L 1/04 |
| 2022/0024293 A1 | 1/2022 | Yanagida et al. | |
| 2022/0073016 A1 | 3/2022 | Yamaguchi et al. | |
| 2022/0219549 A1 | 7/2022 | Slepchenkov et al. | |

FOREIGN PATENT DOCUMENTS

JP 2018-065485 A 4/2018

* cited by examiner

*Primary Examiner* — Rexford N Barnie
*Assistant Examiner* — Aqeel H Bukhari
(74) *Attorney, Agent, or Firm* — Sughrue Mion, PLLC

(57) ABSTRACT

An electric power supplying module includes a module base, a power conversion unit, a first connector, and a second connector. The module base is disposed under a floor of a vehicle. The power conversion unit is supported by the module base, and converts power supplied from a battery. The first connector is supported by the module base, and is connectable with a first routing member that supplies first power output from the power conversion unit to a first load unit of the vehicle. The second connector is supported by the module base, and is connectable with a second routing member that supplies second power output from the power conversion unit to a second load unit of the vehicle.

11 Claims, 10 Drawing Sheets

ELECTRIC POWER SUPPLYING MODULE

BACKGROUND OF THE INVENTION

Field of the Invention

Embodiments of the present invention relate to an electric power supplying module.

Priority is claimed on Japanese Patent Application No. 2023-116079, filed Jul. 14, 2023, the content of which is incorporated herein by reference.

Description of Related Art

A vehicle power supply system including a battery and an electric junction box is known. In the above vehicle power supply system, the power from the battery is distributed to a plurality of loads in a vehicle via the electric junction box disposed in a front section of the vehicle.

CITATION LIST

Patent Document

Patent Document 1: Japanese Unexamined Patent Application, First Publication No. 2018-065485

SUMMARY OF THE INVENTION

An electric power supplying system for a vehicle, by the way, includes a power conversion unit that converts the power supplied from the battery. In a case where such a power conversion unit is disposed in a front section or a rear section of the vehicle, routing members provided in the vehicle may be long.

An embodiment of the present invention provides an electric power supplying module by which the lengths of routing members can be shortened.

An electric power supplying module according to an embodiment of the present invention includes a module base, a power conversion unit, a first connector, and a second connector. The module base is disposed under a floor of a vehicle. The power conversion unit is supported by the module base, and converts power supplied from a battery. The first connector is supported by the module base, and is connectable with a first routing member that supplies first power output from the power conversion unit to a first load unit of the vehicle. The second connector is supported by the module base, and is connectable with a second routing member that supplies second power output from the power conversion unit to a second load unit of the vehicle.

According to the electric power supplying module in one embodiment of the present invention, the lengths of the routing members can be shortened.

DETAILED DESCRIPTION OF THE INVENTION

Hereinafter, embodiments of the present invention will be described with reference to the drawings. In the following description, constitutions having the same or similar functions are denoted by the same reference numbers. In addition, redundant descriptions of these constitutions will be omitted, in some cases. Further, with regard to reference numbers accompanied by alphabetic characters for distinction, in a case where they are not necessarily distinguished from each other, the alphabetic characters at the end may be omitted.

In the present application, terms are defined as follows. The term "connection" is not limited to a mechanical connection, and can include an electric connection. That is, the term "connection" is not limited to a case where two elements to be connected are directly connected, and may include a case where two elements to be connected are connected with another element interposed between them. The term "supported" is not limited to a case of being supported in direct contact, and may include a case of being supported with another element interposed between them. The term "high voltage" or "high-voltage" means a voltage equal to or higher than 48 V. The term "low voltage" or "low-voltage" means a voltage lower than 48 V. In addition, in the present application, front, rear, left, and right are defined based on an advancing direction of the vehicle.

First Embodiment

<1. Constitution of Vehicle>

Figure 1:
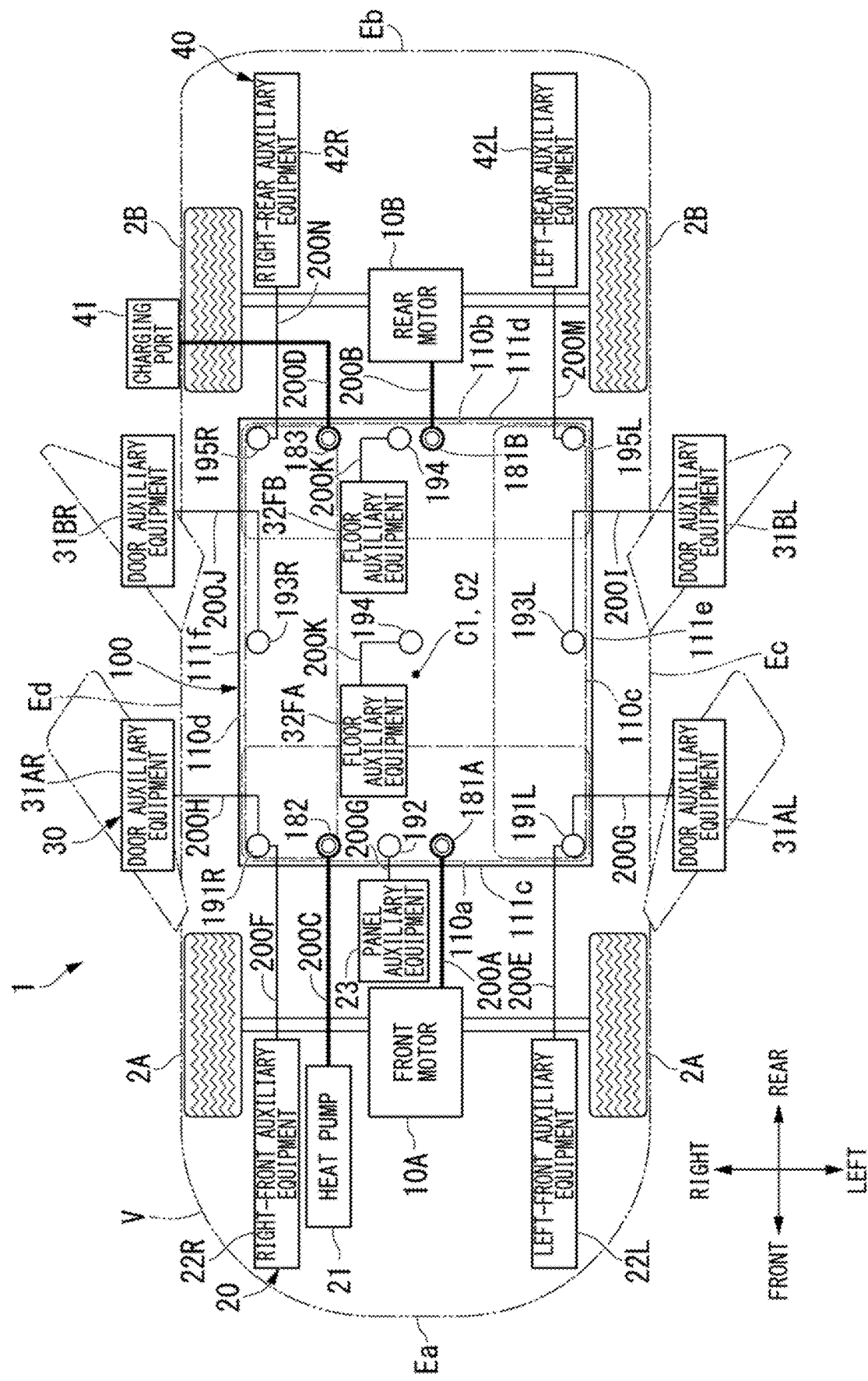
FIG. 1 is a diagram illustrating a constitution of an electric power supplying system in a first embodiment.

FIG. 1 is a diagram illustrating a constitution of an electric power supplying system 1 in a first embodiment. The electric power supplying system 1 is mounted on a vehicle V. The vehicle V is an electric vehicle such as an electric vehicle (EV), a hybrid electric vehicle (HEV), or a plug-in hybrid electric vehicle (PHEV). The vehicle V is, for example, a four wheeled vehicle. However, the vehicle V may be a three wheeled vehicle or a five or more wheeled vehicle.

First, a load unit of the vehicle V will be described.

As illustrated in FIG. 1, the vehicle V includes, for example, a front motor 10A, a rear motor 10B, a front section vehicle-mounted component 20, a vehicle interior vehicle-mounted component 30, and a rear section vehicle-mounted component 40.

<1.1 Front Motor>

The front motor 10A is a drive source for traveling that actuates front wheels 2A of the vehicle V. The front motor 10A is disposed on, for example, a front side relative to a vehicle interior 3 of the vehicle V (see FIG. 2). The operating voltage of the front motor 10A is, for example, 300 V to 400 V. The front motor 10A is an example of a "load unit". The front motor 10A is an example of a "high-voltage load unit" that operates at a high voltage.

<1.2 Rear Motor>

The rear motor 10B is a drive source for traveling that actuates rear wheels 2B of the vehicle V. The rear motor 10B is disposed on, for example, a rear side relative to the vehicle interior 3 of the vehicle V (see FIG. 2). The operating voltage of the rear motor 10B is, for example, 300 V to 400 V. The rear motor 10B is an example of the "load unit". The rear motor 10B is an example of the "high-voltage load unit" that operates at a high voltage. Hereinafter, the front motor 10A and the rear motor 10B will be referred to as "the motor 10", in a case where that are not distinguished from each other.

<1.3 Front Section Vehicle-Mounted Component>

Figure 2:
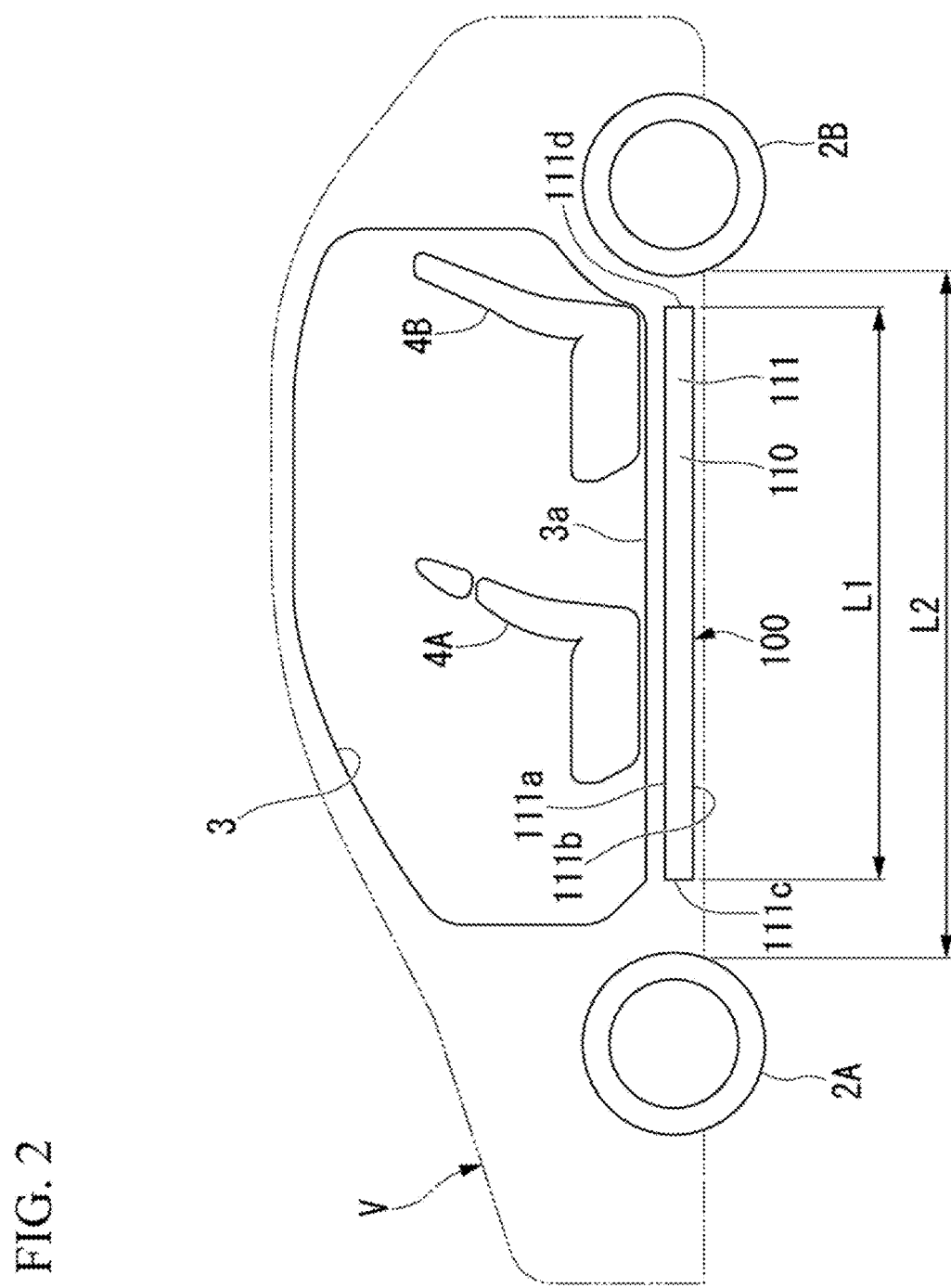
FIG. 2 is a side view showing an electric power supplying module in the first embodiment.

The front section vehicle-mounted component 20 is a vehicle-mounted component disposed on a front side relative to a front seat 4A of the vehicle V (see FIG. 2). The front section vehicle-mounted component 20 includes, for example, a heat pump 21, left-front auxiliary equipment 22L, right-front auxiliary equipment 22R, and instrument panel auxiliary equipment 23 (hereinafter, referred to as "panel auxiliary equipment 23").

The heat pump 21 is a device for conditioning the air in the vehicle V. The heat pump 21 is an example of the "load unit". The heat pump 21 is an example of the "high-voltage load unit" that operates at a high voltage.

The left-front auxiliary equipment 22L denotes a vehicle-mounted component disposed in a left-front section of the vehicle V. The right-front auxiliary equipment 22R denotes a vehicle-mounted component disposed in a right-front section of the vehicle V. Hereinafter, in a case where the left-front auxiliary equipment 22L and the right-front auxiliary equipment 22R are not distinguished from each other, they will be referred to as "the front auxiliary equipment 22". The front auxiliary equipment 22 is an example of the "load unit". The front auxiliary equipment 22 is an example of a "low-voltage load unit" that operates at a low voltage. The front auxiliary equipment 22 includes, for example, a plurality of loads that operate independently of each other. The front auxiliary equipment 22 includes, for example, a headlight 22a and a direction indicator 22b as the plurality of loads (see FIG. 4).

The panel auxiliary equipment 23 includes one or more vehicle-mounted components related to an instrument panel. The panel auxiliary equipment 23 is disposed, for example, in a central section in a width direction (a left-right direction) of the vehicle V. The panel auxiliary equipment 23 is an example of the "load unit". The panel auxiliary equipment 23 is an example of the "low-voltage load unit" that operates at a low voltage. The panel auxiliary equipment 23 includes, for example, a plurality of loads that operate independently of each other. The panel auxiliary equipment 23 includes, for example, a meter 23a and a navigation device 23b as the plurality of loads (see FIG. 4).

<1.4 Vehicle Interior Vehicle-Mounted Component>

The vehicle interior vehicle-mounted component 30 is a vehicle-mounted component related to the vehicle interior 3. The vehicle interior vehicle-mounted component 30 is mounted in an area corresponding to the vehicle interior 3 in a front-rear direction of the vehicle V. The vehicle interior vehicle-mounted component 30 includes, for example, first to fourth door auxiliary equipment 31AL, 31BL, 31AR, and 31BR, and first and second floor auxiliary equipment 32FA and 32FB.

The first door auxiliary equipment 31AL denotes a vehicle-mounted component mounted on a left-front door. The second door auxiliary equipment 31BL denotes a vehicle-mounted component mounted on a left-rear door. The first door auxiliary equipment 31AL and the second door auxiliary equipment 31BL are disposed in a left-end portion of the vehicle V. The third door auxiliary equipment 31AR denotes a vehicle-mounted component mounted on a right-front door. The fourth door auxiliary equipment 31BR denotes a vehicle-mounted component mounted on a right-rear door. The third door auxiliary equipment 31AR and the fourth door auxiliary equipment 31BR are disposed in a right-end portion of the vehicle V.

Hereinafter, in a case where pieces of the first to fourth door auxiliary equipment 31AL, 31BL, 31AR, and 31BR are not distinguished from one another, they will be referred to as "the door auxiliary equipment 31". The door auxiliary equipment 31 is an example of the "load unit". The door auxiliary equipment 31 is an example of the "low-voltage load unit" that operates at a low voltage. The door auxiliary equipment 31 includes, for example, a plurality of loads that operate independently of each other. The door auxiliary equipment 31 includes, for example, a power window 31a and a door lock mechanism 31b as the plurality of loads (see FIG. 4).

The first floor auxiliary equipment 32FA denotes a vehicle-mounted component disposed to correspond to the front seat 4A of the vehicle V (see FIG. 2). The second floor auxiliary equipment 32FB denotes a vehicle-mounted component disposed to correspond to the rear seat 4B of the vehicle V (see FIG. 2). Hereinafter, in a case where pieces of the first and second floor auxiliary equipment 32FA and 32FB are not distinguished from each other, they will be referred to as "the floor auxiliary equipment 32". The floor auxiliary equipment 32 is an example of the "load unit". The floor auxiliary equipment 32 is an example of the "low-voltage load unit" that operates at a low voltage. The floor auxiliary equipment 32 includes, for example, a plurality of loads that operate independently of each other. The floor auxiliary equipment 32 includes, for example, a display device 32a and a sound device 32b as the plurality of loads (see FIG. 4).

<1.5 Rear Section Vehicle-Mounted Component>

The rear section vehicle-mounted component 40 is a vehicle-mounted component disposed on a rear side relative to a rear seat 4B of the vehicle V (see FIG. 2). The rear section vehicle-mounted component 40 includes, for example, a charging port 41, left-rear auxiliary equipment 42L, and right-rear auxiliary equipment 42R.

The charging port 41 denotes an electric connection portion to which an external charging device is connectable. The charging port 41 is, for example, a charging port corresponding to AC power of 100 V or 200 V. However, the charging port 41 may be a charging port for DC power.

The left-rear auxiliary equipment 42L denotes a vehicle-mounted component disposed in a left-rear section of the vehicle V. The right-rear auxiliary equipment 42R denotes a vehicle-mounted component disposed in a right-rear section of the vehicle V. Hereinafter, in a case where the left-rear auxiliary equipment 42L and the right-rear auxiliary equipment 42R are not distinguished from each other, they will be referred to as "the rear auxiliary equipment 42". The rear auxiliary equipment 42 is an example of the "load unit". The rear auxiliary equipment 42 is an example of the "low-voltage load unit" that operates at a low voltage. The rear auxiliary equipment 42 includes, for example, a plurality of loads that operate independently of each other. The rear auxiliary equipment 42 includes, for example, a tail lamp 42a and a direction indicator 42b as the plurality of loads (see FIG. 4).

<2. Constitution of Electric Power Supplying System>

Next, a constitution of the electric power supplying system 1 will be described.

As illustrated in FIG. 1, the electric power supplying system 1 includes an electric power supplying module 100 and a plurality of routing members 200. The electric power supplying module 100 is a module component in which a plurality of functional units related to supply of the power is integrated. The routing member 200 is an electric connection component that extends between the electric power supplying module 100 and the load unit. The routing member 200 is, for example, a wire harness, but may be a cable, a bus bar, a flexible printed circuit board (FPC), or the like.

<3. Module Base>

FIG. 2 is a side view showing the electric power supplying module 100. The electric power supplying module 100 includes a module base 110. The module base 110 is a support member that supports various components included in the electric power supplying module 100.

The module base 110 includes at least one of one or more housings and one or more base members. In the present embodiment, an example in which the module base 110 is formed of one case 111 will be described. The case 111 is an example of a "housing".

In the present embodiment, the case 111 is formed in a box shape. The case 111 includes, for example, an upper wall 111a, a lower wall 111b, a front wall 111c, a rear wall 111d, a left wall 11e (see FIG. 1), and a right wall 111f (see FIG. 1).

The upper wall 111a is a wall portion along a horizontal direction. The lower wall 111b is a wall portion along the horizontal direction similarly to the upper wall 111a. The lower wall 111b is positioned below the upper wall 111a with a housing space between the lower wall 111b and the upper wall 111a. The front wall 111c is a wall portion along an up-down direction and the left-right direction. The front wall 111c connects a front-end portion of the upper wall 111a with a front-end portion of the lower wall 111b. The rear wall 111d is a wall portion along the up-down direction and the left-right direction. The rear wall 111d connects a rear-end portion of the upper wall 111a with a rear-end portion of the lower wall 111b. The left wall 111e is a wall portion along the up-down direction and the front-rear direction. The left wall 111e connects a left-end portion of the upper wall 111a with a left-end portion of the lower wall 111b. The right wall 111f is a wall portion along the up-down direction and the front-rear direction. The right wall 111f connects a right-end portion of the upper wall 111a with a right-end portion of the lower wall 111b.

However, one or more of the upper wall 111a, the lower wall 111b, the front wall 111c, the rear wall 111d, the left wall 111e, and the right wall 111f may be omitted. The term "housing" used in the present application means a member that covers a component disposed inside the housing from two or more directions (for example, three or more directions). A frame body without the upper wall 111a or the lower wall 111b, a letter U-shaped member without the upper wall 111a, the lower wall 111b, or the rear wall 111d, or the like corresponds to an example of the "housing".

As illustrated in FIG. 2, the case 111 (the module base 110) is disposed under the floor of the vehicle V. For example, the vehicle V includes a floor surface member 3a, which defines a floor surface of the vehicle interior 3. The case 111 (the module base 110) is disposed under the floor surface member 3a. In the present embodiment, a length L1 of the case 111 (the module base 110) in the front-rear direction is smaller than a distance L2 between the front wheel 2A and the rear wheel 2B.

As illustrated in FIG. 1, the case 111 (the module base 110) includes a front-end portion 110a, a rear-end portion 110b, a left-end portion 110c, and a right-end portion 110d.

When the vehicle V is viewed from above, the front-end portion 110a is disposed between a center C1 in the front-rear direction of the vehicle V and a front end Ea of the vehicle V. In a case where the case 111 (the module base 110) is divided into four areas in the front-rear direction of the vehicle V, the front-end portion 110a is a foremost area among the four divided areas. When the vehicle V is viewed from above, the rear-end portion 110b is disposed between the center C1 in the front-rear direction of the vehicle V and a rear end Eb of the vehicle V. In the case where the case 111 (the module base 110) is divided into four areas in the front-rear direction of the vehicle V, the rear-end portion 110b is a rearmost area among the four divided areas.

When the vehicle V is viewed from above, the left-end portion 110c is disposed between a center C2 in the width direction of the vehicle V and a left end Ec of the vehicle V. In a case where the case 111 (the module base 110) is divided into four areas in the width direction of the vehicle V, the left-end portion 110c is a leftmost area among the four divided areas. When the vehicle V is viewed from above, the right-end portion 110d is disposed between the center C2 in the width direction of the vehicle V and a right end Ed of the vehicle V. In the case where the case 111 (the module base 110) is divided into four areas in the width direction of the vehicle V, the right-end portion 110d is a rightmost area among the four divided areas.

The case 111 is made of metal, for example. The case 111 is electrically connected with the ground of the vehicle V. The case 111 is electrically connected with the ground, and thus functions as an electromagnetic interference (EMI) countermeasure component related to components included in the electric power supplying module 100.

<4. Components in Electric Power Supplying Module>

Figure 3:
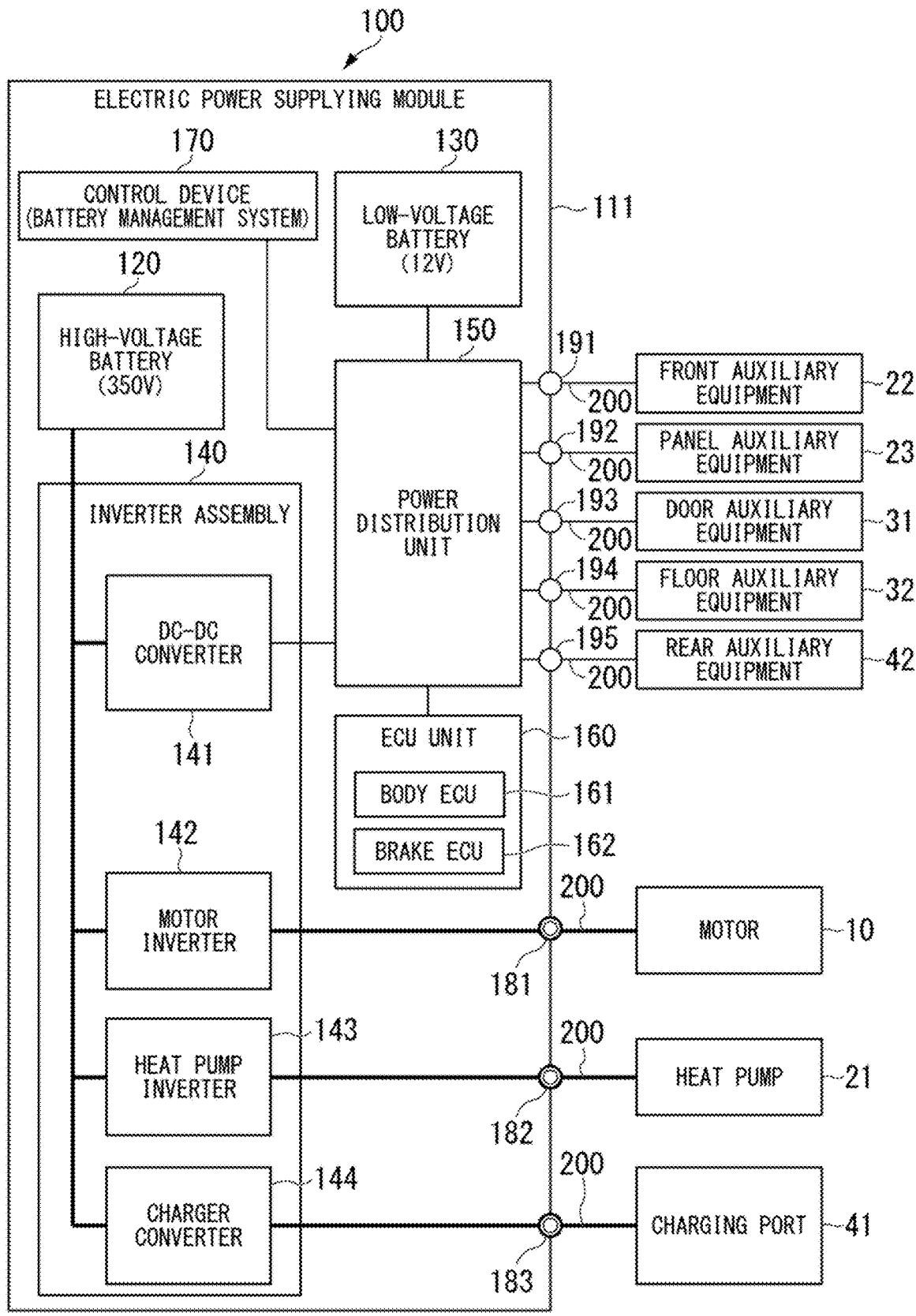
FIG. 3 is a block diagram illustrating an electric constitution of the electric power supplying module in the first embodiment.

FIG. 3 is a block diagram illustrating an electric constitution of the electric power supplying module 100. The electric power supplying module 100 includes, for example, a high-voltage battery 120, a low-voltage battery 130, an inverter assembly 140, a power distribution unit 150, an electronic control unit (ECU) unit 160, and a control device 170.

The high-voltage battery 120, the low-voltage battery 130, the inverter assembly 140, the power distribution unit 150, the ECU unit 160, and the control device 170 are supported by the module base 110. In the present embodiment, the high-voltage battery 120, the low-voltage battery 130, the inverter assembly 140, the power distribution unit 150, the ECU unit 160, and the control device 170 are housed in one case 111.

<4.1 High-Voltage Battery>

The high-voltage battery 120 is a battery capable of supplying high-voltage power equal to or higher than 100 V (for example, 350 V). The high-voltage battery 120 is formed of, for example, a plurality of battery cells electrically connected in series or in parallel. The high-voltage battery 120 is an example of a "first battery".

<4.2 Low-Voltage Battery>

The low-voltage battery 130 is a battery capable of supplying low-voltage power lower than 100 V (for example, 12 V). The low-voltage battery 130 is formed of, for example, a plurality of battery cells electrically connected in series or in parallel. The low-voltage battery 130 is an example of a "second battery".

<4.3 Inverter Assembly>

The inverter assembly 140 is a functional unit that converts the electric power supplied from the high-voltage battery 120. The inverter assembly 140 is an example of a "power conversion unit". The inverter assembly 140 includes, for example, a DC-DC converter 141, a motor inverter 142, a heat pump inverter 143, and a charger converter 144.

However, the term "power conversion unit" used in the present application may have at least one of a function of converting DC power supplied from the battery into AC power and a function of converting DC power supplied from the battery into another type of DC power having a different voltage (DC power that has been boosted or stepped down). The term "power conversion unit" used in the present application may be implemented by at least one of the DC-DC converter 141, the motor inverter 142, the heat pump inverter 143, and the charger converter 144.

(DC-DC Converter)

The DC-DC converter 141 is a power conversion device that converts DC power of a certain voltage supplied from the high-voltage battery 120 into DC power of a voltage lower than the above voltage. For example, the DC-DC converter 141 converts high-voltage DC power supplied from the high-voltage battery 120 into low-voltage DC power. In the present embodiment, the DC-DC converter 141 converts the high-voltage DC power supplied from the high-voltage battery 120 into two or more types of low-voltage DC power (for example, DC power of 12 V and DC power of 5 V). The DC-DC converter 141 outputs the obtained low-voltage DC power to the power distribution unit 150. The DC-DC converter 141 is an example of a "first power conversion device".

(Motor Inverter)

The motor inverter 142 is a power conversion device that converts the DC power supplied from the high-voltage battery 120 into AC power (for example, three-phase AC). For example, the motor inverter 142 converts the high-voltage DC power supplied from the high-voltage battery 120 into high-voltage AC power. The motor inverter 142 outputs the obtained AC power to the motor 10 through a high-voltage connector 181 to be described later. The motor inverter 142 is an example of a "second power conversion device".

(Heat Pump Inverter)

The heat pump inverter 143 is a power conversion device that converts the DC power supplied from the high-voltage battery 120 into AC power (for example, single-phase AC). For example, the heat pump inverter 143 converts the high-voltage DC power supplied from the high-voltage battery 120 into high-voltage AC power. The heat pump inverter 143 outputs the obtained AC power to the heat pump 21 through a high-voltage connector 182 to be described later. The heat pump inverter 143 is another example of the "second power conversion device".

(Charger Converter)

The charger converter 144 is a power conversion device that converts AC power for charging supplied from the outside into DC power. For example, the charger converter 144 is electrically connected with the charging port 41 through a high-voltage connector 183 to be described later. The charger converter 144 converts high-voltage AC power supplied from the outside through the charging port 41 and the high-voltage connector 183 into high-voltage DC power. The charger converter 144 outputs the obtained DC power to the high-voltage battery 120.

<4.4 Power Distribution Unit>

The power distribution unit 150 is a distribution device that distributes and supplies the power that has been supplied to the power distribution unit 150 to a plurality of load units (and/or a plurality of loads) of the vehicle V. In the present embodiment, the power distribution unit 150 distributes and supplies the low-voltage DC power that has been supplied from the DC-DC converter 141 to a plurality of load units (for example, the front auxiliary equipment 22L and 22R, the panel auxiliary equipment 23, the door auxiliary equipment 31AL, 31BL, 31AR, and 31BR, the floor auxiliary equipment 32FA and 32FB, the rear auxiliary equipment 42L and 42R, the ECU unit 160, and the control device 170).

In the present embodiment, the power distribution unit 150 is connected with the low-voltage battery 130. For example, when an abnormality occurs in the high-voltage battery 120 or the DC-DC converter 141, the power distribution unit 150 distributes and supplies the low-voltage DC power supplied from the low-voltage battery 130 to at least a part of the above plurality of load units. In addition, the power distribution unit 150 distributes and supplies the low-voltage DC power supplied from the low-voltage battery 130 to at least a part of the plurality of load units, for example, at the time of startup before the vehicle V starts operating.

In the present embodiment, the power distribution unit 150 supplies a part of the distributed power to the front auxiliary equipment 22 through a low-voltage connector 191 to be described later. The power distribution unit 150 supplies a part of the distributed power to the panel auxiliary equipment 23 through a low-voltage connector 192 to be described later. The power distribution unit 150 supplies a part of the distributed power to the door auxiliary equipment 31 through a low-voltage connector 193 (or the low-voltage connector 191, see FIG. 1) to be described later. The power distribution unit 150 supplies a part of the distributed power to the floor auxiliary equipment 32 through a low-voltage connector 194 to be described later. The power distribution unit 150 supplies a part of the distributed power to the rear auxiliary equipment 42 through a low-voltage connector 195 to be described later. The power distribution unit 150 supplies a part of the distributed power to the ECU unit 160 and the control device 170 in the electric power supplying module 100.

Next, details of the power distribution unit 150 will be described.

Figure 4:
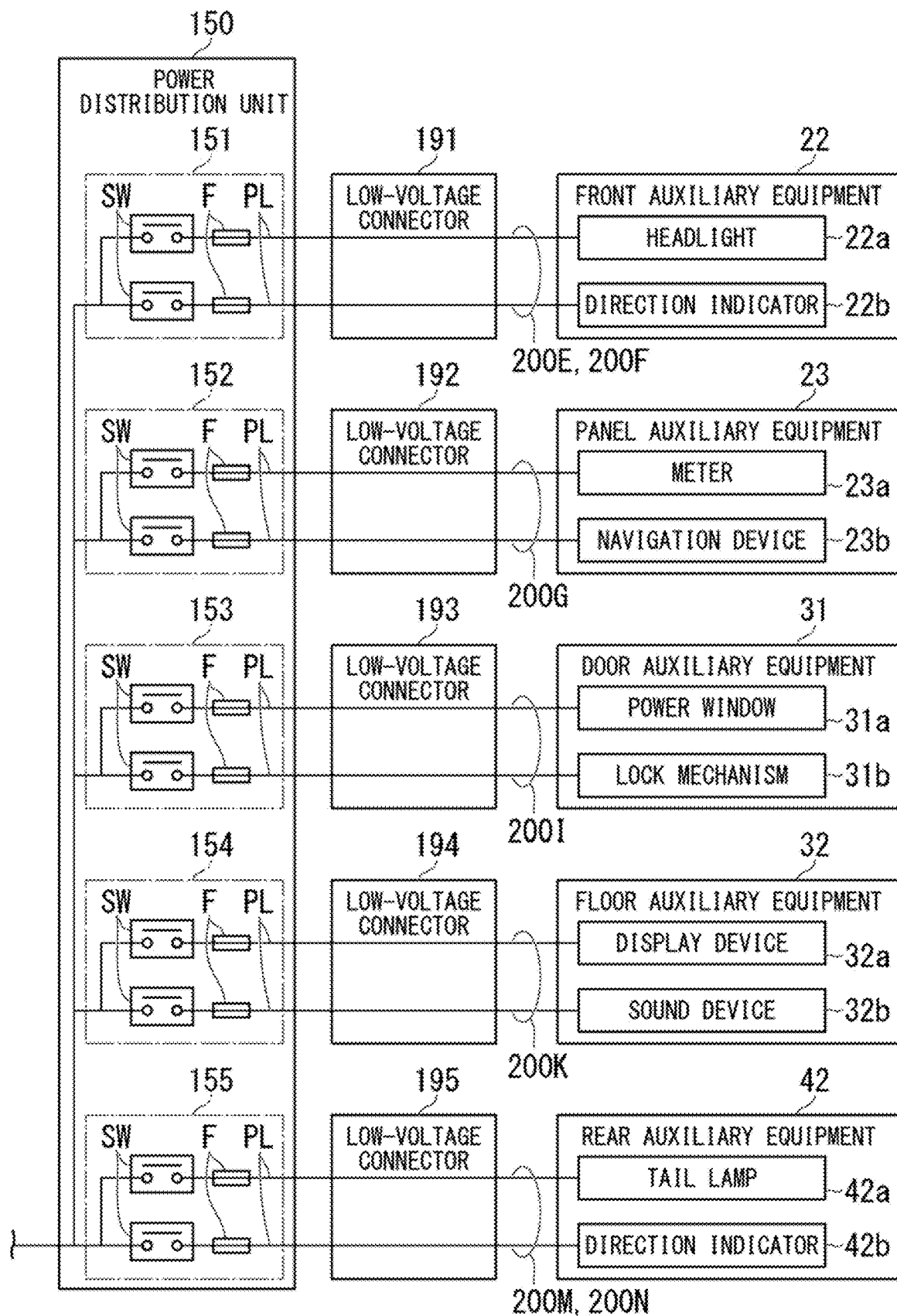
FIG. 4 is a block diagram showing details of a power distribution unit in the first embodiment.

FIG. 4 is a block diagram showing details of the power distribution unit 150. The power distribution unit 150 includes power distributors 151 to 155.

The power distributor 151 is an electric circuit portion that distributes the power that has been supplied to the power distribution unit 150 to a plurality of loads included in the front auxiliary equipment 22. The power distributor 152 is an electric circuit portion that distributes the power that has been supplied to the power distribution unit 150 to a plurality of loads included in the panel auxiliary equipment 23. The power distributor 153 is an electric circuit portion that distributes the power that has been supplied to the power distribution unit 150 to a plurality of loads included in the door auxiliary equipment 31. The power distributor 154 is an electric circuit portion that distributes the power that has been supplied to the power distribution unit 150 to a plurality of loads included in the floor auxiliary equipment 32. The power distributor 155 is an electric circuit portion that distributes the power that has been supplied to the power distribution unit 150 to a plurality of loads included in the rear auxiliary equipment 42.

Each of the power distributors 151 to 155 includes a plurality of power lines PL respectively corresponding to a plurality of loads. A switching element SW (for example, a relay or a transistor) and a cut-off component F (for example, a fuse) are provided partway in each power line PL. The switching element SW switches the state of the power line PL provided with the switching element SW between a conduction state and a non-conduction state, based on a signal from the control device 170 to be described later. For example, in a case where a detection result of a voltage sensor, a current sensor, or a temperature sensor, not illustrated, satisfies a preset condition, the cut-off component F cuts off the power line PL, which is provided with the cut-off component F.

<4.5 ECU Unit>

Returning to FIG. 3, the remaining constitution of the electric power supplying module 100 will be described.

The ECU unit 160 is a control device that controls electric components mounted on the vehicle V. The ECU unit 160 includes, for example, a body ECU 161 and a brake ECU 162. The body ECU 161 is a control device that controls the above-described vehicle-mounted components (for example, the front auxiliary equipment 22, the panel auxiliary equipment 23, the door auxiliary equipment 31, the floor auxiliary equipment 32, and the rear auxiliary equipment 42). The brake ECU 162 is a control device that controls the brake of the vehicle V. The ECU unit 160 is an example of the "load unit".

<4.6 Control Device>

The control device 170 is a control device that controls the electric power supplying module 100. The control device 170 includes, for example, a battery management system. By controlling, for example, the inverter assembly 140 and the power distribution unit 150, the battery management system controls the power supplied from the electric power supplying module 100 to the plurality of load units. The control device 170 is an example of the "load unit".

<5. Connectors>

Next, referring back to FIG. 1, the connectors will be described.

As illustrated in FIG. 1, the electric power supplying module 100 includes a plurality of high-voltage connectors 181 to 183 and a plurality of low-voltage connectors 191 to 195. The high-voltage connectors 181 to 183 are each a connector corresponding to high voltage. The low-voltage connectors 191 to 195 are each a connector corresponding to low voltage.

<5.1 Mounted Structure of Connectors>

As illustrated in FIG. 1, the plurality of high-voltage connectors 181 to 183 and the plurality of low-voltage connectors 191 to 195 are supported by the case 111 (the module base 110). In the present application, "the connector is supported by the case", "the connector is provided in the case", and "the connector is disposed in an end portion of the case" are not limited to a case where the connector is fixed to an outer surface of the case 111, and are applicable to a case where the connector is housed inside the case 111 and exposed to the outside of the case 111 through an opening of the case 111.

<5.2 Arrangement of Connectors>

(Connector for Motor)

As illustrated in FIG. 1, the plurality of high-voltage connectors 181 include a high-voltage connector 181A and a high-voltage connector 181B. The high-voltage connector 181A is a connector corresponding to the front motor 10A. The high-voltage connector 181A is disposed at the front-end portion 110a of the case 111. A routing member 200A is connected with the high-voltage connector 181A. The routing member 200A is a routing member that supplies the high-voltage AC power to the front motor 10A.

On the other hand, the high-voltage connector 181B is a connector corresponding to the rear motor 10B. The high-voltage connector 181B is disposed at the rear-end portion 110b of the case 111. A routing member 200B is connected with the high-voltage connector 181B. The routing member 200B is a routing member that supplies the high-voltage AC power from the high-voltage connector 181B to the rear motor 10B.

(Connector for Heat Pump)

The high-voltage connector 182 is a connector corresponding to the heat pump 21. The high-voltage connector 182 is disposed at the front-end portion 110a of the case 111. A routing member 200C is connected with the high-voltage connector 182. The routing member 200C is a routing member that supplies the high-voltage AC power to the heat pump 21.

(Connector for Charging Port)

The high-voltage connector 183 is a connector corresponding to the charging port 41. The high-voltage connector 183 is disposed at the rear-end portion 110b of the case 111. A routing member 200D is connected with the high-voltage connector 183. The routing member 200D is a routing member that supplies the high-voltage AC power from the charging port 41 to the high-voltage connector 183.

(Connector for Front Auxiliary Equipment)

The plurality of low-voltage connectors 191 include a low-voltage connector 191L and a low-voltage connector 191R. The low-voltage connector 191L is a connector corresponding to the left-front auxiliary equipment 22L. The low-voltage connector 191L is disposed at the front-end portion 110a of the case 111 that is also a left-front corner portion of the case 111 in the left-end portion 110c. A routing member 200E is connected with the low-voltage connector 191L. The routing member 200E is a routing member that supplies the low-voltage DC power to the left-front auxiliary equipment 22L. In the present embodiment, the routing member 200E is a routing member that electrically supplies the power that has been distributed by the power distributor 151 to a plurality of loads included in the left-front auxiliary equipment 22L in parallel. Note that in the present embodiment, a routing member 200G, which supplies the low-voltage DC power to the door auxiliary equipment 31AL, is also connected with the connector 191L. The routing member 200G is a routing member that electrically supplies the power that has been distributed by the power distributor 151 to a plurality of loads included in the door auxiliary equipment 31AL in parallel.

The low-voltage connector 191R is a connector corresponding to the right-front auxiliary equipment 22R. The low-voltage connector 191R is disposed at the front-end portion 110a of the case 111 that is also a right-front corner portion of the case 111 in the right-end portion 110d. A routing member 200F is connected with the low-voltage connector 191R. The routing member 200F is a routing member that supplies the low-voltage DC power to the right-front auxiliary equipment 22R. In the present embodiment, the routing member 200F is a routing member that electrically supplies the power that has been distributed by the power distributor 151 to a plurality of loads included in the right-front auxiliary equipment 22R in parallel. Note that in the present embodiment, a routing member 200H, which supplies the low-voltage DC power to the door auxiliary equipment 31AR, is also connected with the connector 191R. The routing member 200H is a routing member that electrically supplies the power that has been distributed by the power distributor 151 to a plurality of loads included in the door auxiliary equipment 31AR in parallel.

(Connector for Panel Auxiliary Equipment)

The low-voltage connector 192 is a connector corresponding to the panel auxiliary equipment 23. The low-voltage connector 192 is disposed at the front-end portion 110a of the case 111. A routing member 200G is connected with the low-voltage connector 192. The routing member 200G is a routing member that supplies the low-voltage DC power to the panel auxiliary equipment 23. In the present embodiment, the routing member 200G is a routing member that electrically supplies the power that has been distributed by the power distributor 152 to a plurality of loads included in the panel auxiliary equipment 23 in parallel.

(Connector for Door Auxiliary Equipment)

A low-voltage connector 193L is a connector corresponding to the door auxiliary equipment 31BL. The low-voltage connector 193L is disposed at a left-end portion 110c of the case 111. A routing member 200I is connected with the low-voltage connector 193L. The routing member 200I is a routing member that supplies the low-voltage DC power to the door auxiliary equipment 31BL. In the present embodiment, the routing member 200I is a routing member that electrically supplies the power that has been distributed by the power distributor 153 to a plurality of loads included in the door auxiliary equipment 31 in parallel.

The low-voltage connector 193R is a connector corresponding to the door auxiliary equipment 31BR. The low-voltage connector 193R is disposed at a right-end portion 110d of the case 111. A routing member 200J is connected with the low-voltage connector 193R. The routing member 200J is a routing member that supplies the low-voltage DC power to the door auxiliary equipment 31BR. In the present embodiment, the routing member 200J is a routing member that electrically supplies the power that has been distributed by the power distributor 153 to a plurality of loads included in the door auxiliary equipment 31 in parallel.

(Connector for Floor Auxiliary Equipment)

The low-voltage connector 194 is a connector corresponding to the floor auxiliary equipment 32. The low-voltage connector 194 is disposed, for example, in the central section in the left-right direction of the case 111. A routing member 200K is connected with the low-voltage connector 194. The routing member 200K is a routing member that supplies the low-voltage DC power to the floor auxiliary equipment 32. In the present embodiment, the routing member 200K is a routing member that electrically supplies the power that has been distributed by the power distributor 154 to a plurality of loads included in the floor auxiliary equipment 32 in parallel.

(Connector for Rear Auxiliary Equipment)

The plurality of low-voltage connectors 195 include a low-voltage connector 195L and a low-voltage connector 195R. The low-voltage connector 195L is a connector corresponding to the left-rear auxiliary equipment 42L. The low-voltage connector 195L is disposed at the rear-end portion 110b of the case 111 that is also a left-rear corner portion of the case 111 in the left-end portion 110c. A routing member 200M is connected with the low-voltage connector 195L. The routing member 200M is a routing member that supplies the low-voltage DC power to the left-rear auxiliary equipment 42L. In the present embodiment, the routing member 200M is a routing member that electrically supplies the power that has been distributed by the power distributor 155 to a plurality of loads included in the left-rear auxiliary equipment 42L in parallel.

The low-voltage connector 195R is a connector corresponding to the right-rear auxiliary equipment 42R. The low-voltage connector 195R is disposed at the rear-end portion 110b of the case 111 that is also a right-rear corner portion of the case 111 in the right-end portion 110d. A routing member 200N is connected with the low-voltage connector 195R. The routing member 200N is a routing member that supplies the low-voltage DC power to the right-rear auxiliary equipment 42R. In the present embodiment, the routing member 200N is a routing member that electrically supplies the power that has been distributed by the power distributor 155 to a plurality of loads included in the right-rear auxiliary equipment 42R in parallel.

Note that the above-described various routing members 200 each may include a signal line for transmitting and receiving signals between the ECU unit 160 and each load unit, in addition to the power line.

<6. Arrangement Example in Electric Power Supplying Module>

Next, an arrangement example in the electric power supplying module 100 will be described.

Figure 5:
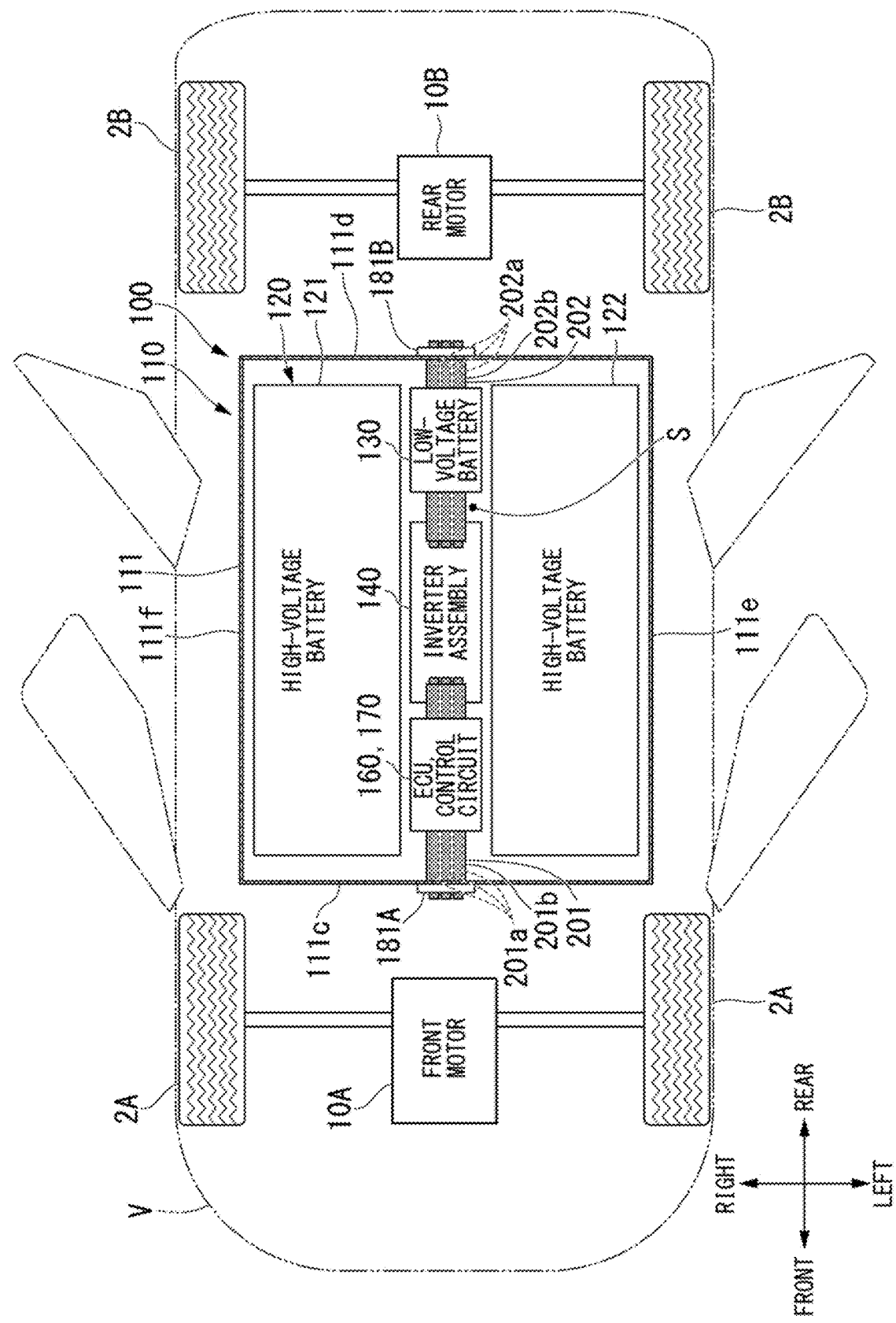
FIG. 5 is a cross-sectional view illustrating an arrangement example in the electric power supplying module in the first embodiment.
Figure 6:
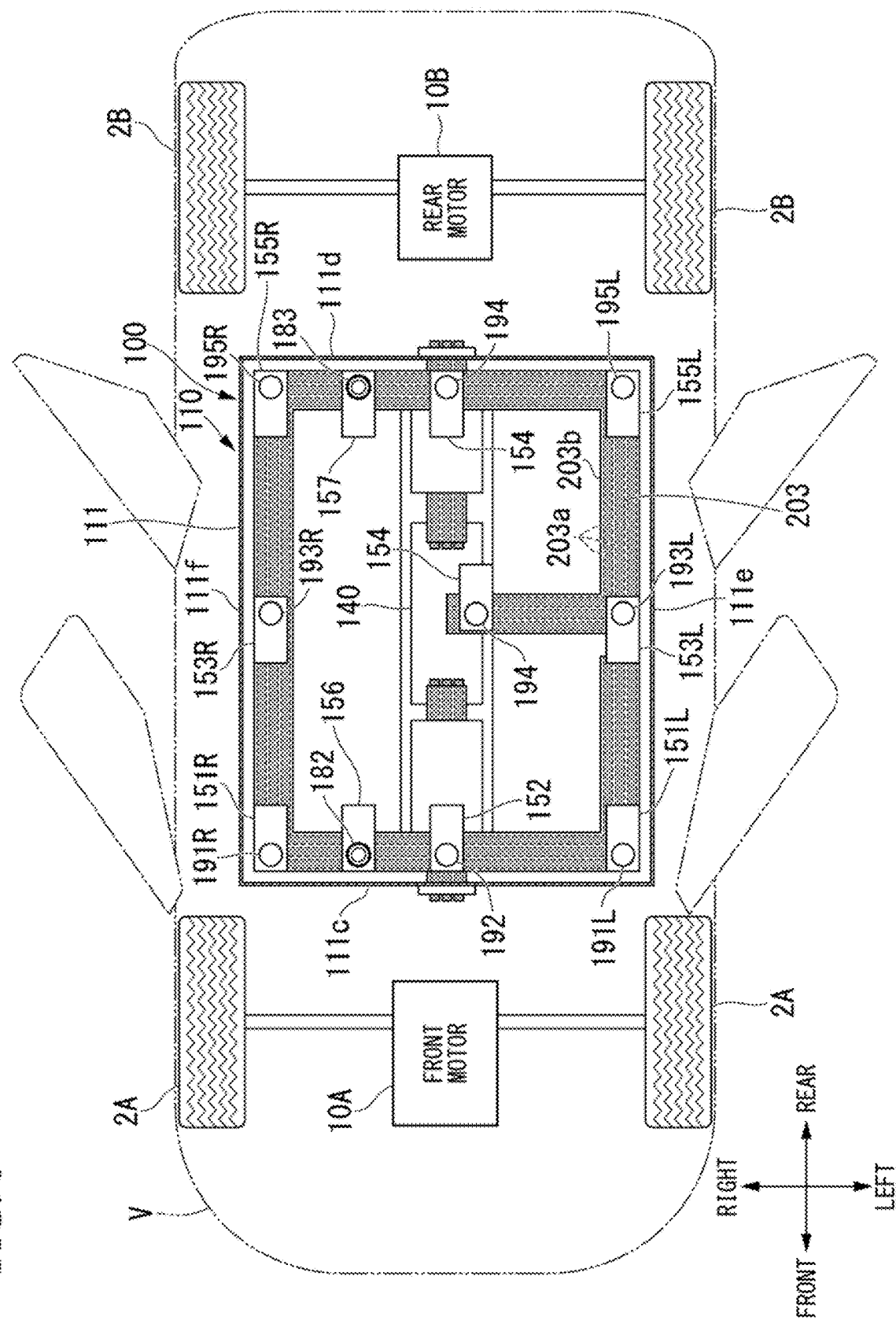
FIG. 6 is a cross-sectional view illustrating an arrangement example in the electric power supplying module in the first embodiment.

FIGS. 5 and 6 are diagrams each illustrating an arrangement example in the electric power supplying module 100. As illustrated in FIG. 5, the high-voltage battery 120 includes a first battery unit 121 and a second battery unit 122. The first battery unit 121 and the second battery unit 122 are arranged side by side in the width direction of the vehicle V. A gap S is provided between the first battery unit 121 and the second battery unit 122.

In the example illustrated in FIG. 5, the low-voltage battery 130, the inverter assembly 140, the ECU unit 160, and the control device 170 are disposed in the gap S between the first battery unit 121 and the second battery unit 122. For example, the inverter assembly 140 is disposed in the central section of the electric power supplying module 100 in the front-rear direction of the vehicle V. When viewed from above, the low-voltage battery 130 is disposed between the inverter assembly 140 and the rear wall 111d of the case 111. When viewed from above, the ECU unit 160 and the control device 170 are disposed between the inverter assembly 140 and the front wall 111c of the case 111.

In the example illustrated in FIG. 5, the high-voltage connector 181A is fixed to the front wall 111c of the case 111. Inside the case 111, an electric connection member 201 is provided between the high-voltage connector 181A and the inverter assembly 140. The electric connection member 201 includes, for example, a plurality of (for example, three) bus bars 201a and a protection member 201b. The bus bar 201a is a metal plate member. The plurality of bus bars 201a are arranged side by side in the width direction of the vehicle V. The plurality of bus bars 201a are adapted to, for example, a U-phase, a V-phase, and a W-phase of three-phase alternating current. The protection member 201b is an insulation member that covers the plurality of bus bars 201a. A protection member 202b electrically insulates the plurality of bus bars 201a from one another. The electric connection member 201 extends to pass below, for example, the ECU unit 160 and the control device 170.

On the other hand, the high-voltage connector 181B is fixed to the rear wall 111d of the case 111. Inside the case 111, an electric connection member 202 is provided between the high-voltage connector 181B and the inverter assembly 140. The electric connection member 202 includes, for example, a plurality of bus bars 202a and a protection member 202b. The bus bar 202a is a metal plate member. The plurality of bus bars 202a are arranged side by side in the width direction of the vehicle V. The plurality of bus bars 202a are adapted to, for example, a U-phase, a V-phase, and a W-phase of three-phase alternating current. The protection member 202b is an insulation member that covers the plurality of bus bars 202a. The protection member 202b electrically insulates the plurality of bus bars 202a from each other. The electric connection member 202 extends to pass below, for example, the low-voltage battery 130.

As illustrated in FIG. 6, the electric power supplying module 100 includes an electric connection member 203. The electric connection member 203 is connected with the inverter assembly 140. The electric connection member 203 includes, for example, a plurality of (for example, three) bus bars 203a and a protection member 203b. The bus bar 203a is a metal plate member. The plurality of bus bars 203a are arranged side by side in the horizontal direction. The plurality of bus bars 203a extend in parallel with one another. The plurality of bus bars 203a correspond to, for example, DC power of 12 V and DC power of 5 V that have been respectively output from the DC-DC converter 141, and single-phase AC power that has been output from the heat pump inverter 143. The protection member 203b is an insulation member that covers the plurality of bus bars 203a. The protection member 203b electrically insulates the plurality of bus bars 203a from each other.

For example, inside the case 111, the electric connection member 203 extends sequentially along a part of the left wall 111e, the rear wall 111d, the right wall 111f, the front wall 111c, and another part of the left wall 111e of the case 111. The electric connection member 203 extends, for example, to sequentially pass below the power distributors 151 to 155 of the power distribution unit 150.

In the present embodiment, the power distributors 151 to 155 of the power distribution unit 150 are disposed inside the case 111 in a distributed manner. For example, the power distributors 151 to 155 of the power distribution unit 150 are attached to the cases 111 (the module base 110) to be spaced apart from one another.

In the present embodiment, the power distribution unit 150 includes a power distributor 151L and a power distributor 151R as the power distributor 151. The power distributor 151L is disposed at the left-front corner portion of the case 111 so as to be positioned below the low-voltage connector 191L. The power distributor 151L is connected with the electric connection member 203 at the left-front corner portion of the case 111. The power distributor 151R is disposed at the right-front corner portion of the case 111 so as to be positioned below the low-voltage connector 191R. The power distributor 151R is connected with the electric connection member 203 at the right-front corner portion of the case 111.

The power distributor 152 is disposed at the front-end portion 110a of the case 111 so as to be positioned below the low-voltage connector 192. The power distributor 152 is connected with the electric connection member 203 at the front-end portion 110a of the case 111.

The power distribution unit 150 includes a power distributor 153L and a power distributor 153R as the power distributor 153. The power distributor 153L is disposed at the left-end portion 110e of the case 111 so as to be positioned below the low-voltage connector 193L. The power distributor 153L is connected with the electric connection member 203 at the left-end portion 110e of the case 111. The power distributor 153R is disposed at the right-end portion 110f of the case 111 so as to be positioned below the low-voltage connector 193R. The power distributor 155L is connected with the electric connection member 203 at the right-end portion 110f of the case 111.

The power distributor 154 is disposed in the central section in the left-right direction of the case 111 so as to be positioned below the low-voltage connector 194. The power distributor 154 is connected with the electric connection member 203 in the central section in the left-right direction of the case 111.

The power distribution unit 150 includes a power distributor 155L and a power distributor 155R as the power distributor 155. The power distributor 155L is disposed at the left-rear corner portion of the case 111 so as to be positioned below the low-voltage connector 195L. The power distributor 155L is connected with the electric connection member 203 at the left-rear corner portion of the case 111. The power distributor 155R is disposed at the right-rear corner portion of the case 111 so as to be positioned below the low-voltage connector 195R. The power distributor 155R is connected with the electric connection member 203 at the right-rear corner portion of the case 111.

In the present embodiment, the electric power supplying module 100 includes a power distributor 156 and a connection component 157. Similarly to the power distributors 151 to 155, the power distributor 156 and the connection component 157 each includes a power line PL, a switching element SW, and a cut-off component F.

The power distributor 156 is a connection component that connects the high-voltage connector 182 with the electric connection member 203. The power distributor 156 is disposed at the front-end portion 110a of case 111 so as to be positioned below the high-voltage connector 182. The power distributor 156 is connected with the electric connection member 203 at the front-end portion 110a of the case 111. On the other hand, the connection component 157 is a component that connects the high-voltage connector 183 with the electric connection member 203. The connection component 157 is disposed at the rear-end portion 110b of case 111 so as to be positioned below the high-voltage connector 183. The connection component 157 is connected with the electric connection member 203 at the rear-end portion 110b of the case 111.

Figure 7:
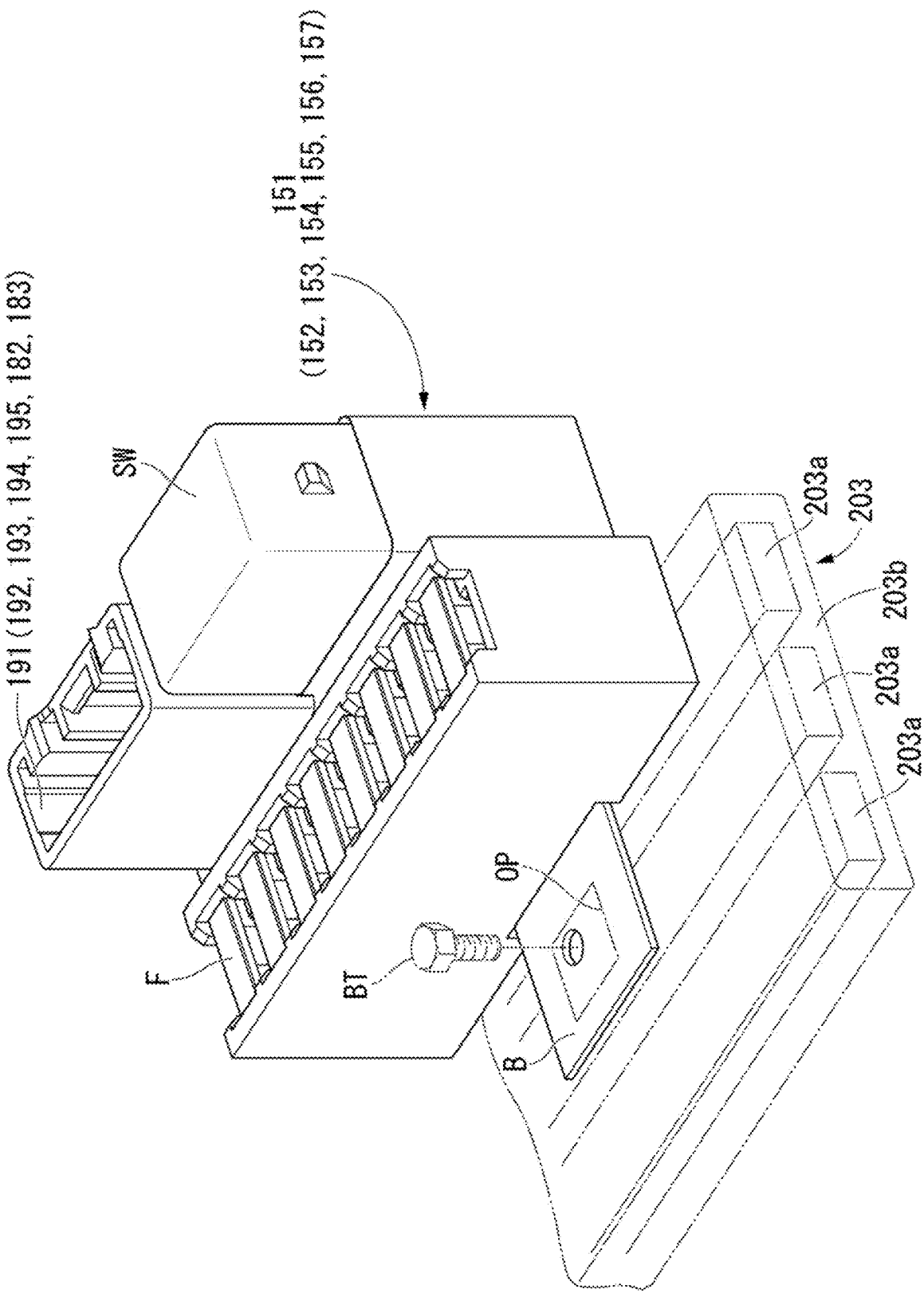
FIG. 7 is a perspective view showing a power conversion unit and a connector in the first embodiment.

FIG. 7 is a perspective view showing the power distributor 151 and the connector 191. In the present embodiment, the power distributor 151 and the low-voltage connector 191 are provided as one unit. For example, the power distributor 151 is fixed to the case 111, and thus the low-voltage connector 191 is supported by the case 111.

The power distributor 151 includes a bus bar B, which is connected with the electric connection member 203. When viewed from above, the bus bar B overlaps the bus bar 203a, which is a connection destination included in the electric connection member 203. The electric connection member 203 includes an opening portion OP, which exposes the bus bar 203a as the connection destination at a position corresponding to the bus bar B. The bus bar B is connected with the bus bar 203a as the connection destination via a fastening member BT such as a bolt, for example. The above-described constitution related to the power distributor 151 is also applied to the power distributors 152 to 156 and the connection component 157.

<7. Advantages>

As a comparative example, consideration is given to an electric power supplying system including a battery disposed under a floor and a power conversion unit that converts the power supplied from the above battery. In this comparative example, the power conversion unit is disposed in the front section of the vehicle. In the constitution of this comparative example, in addition to a routing member that connects the battery disposed under the floor with the power conversion unit disposed in the front section of the vehicle, a long routing member that connects each section of the vehicle including the rear section of the vehicle with the front section of the vehicle is necessary.

On the other hand, in the present embodiment, the electric power supplying module 100 includes the module base 110, which is disposed under the floor of the vehicle V, the power conversion unit supported by the module base 110, the first connector supported by the module base 110, and the second connector supported by the module base 110. The routing member 200, which supplies first power output from the above power conversion unit to the first load unit, is connectable with the first connector. The routing member 200, which supplies second power output from the power conversion unit to the second load unit, is connectable with the second connector.

According to such a constitution, the length of the first routing member can be shortened to a length that connects the first load unit with the first connector disposed under the floor of the vehicle. In addition, the length of the second routing member can be shortened to a length that connects the second load unit with the second connector disposed under the floor of the vehicle. Therefore, the lengths of the routing members can be shortened. In addition, according to the above constitution, a large difference in length between the first routing member and the second routing member can be avoided. By making it possible to reduce the difference in length between the plurality of routing members, it becomes possible to improve assembling performance of the routing members in the vehicle V In addition, by making it possible to eliminate or reduce the routing member that largely traverses under the floor, it becomes possible to reduce the space for the routing member formed under the floor. By making it possible to reduce the space for the routing member, it becomes possible to increase the space in the vehicle V.

In addition, from another point of view, the module base 110, which is disposed under the floor of the vehicle V, and the power conversion unit, the first connector, and the second connector, which are respectively supported by the module base 110, are included, so that the electric power supplying module 100, which is for a general purpose and which is easily adapted to a plurality of vehicle types, can be provided.

In addition, in the present embodiment, as illustrated in FIG. 6, the plurality of power distributors 151 to 155 are arranged in a distributed manner inside the case 111. According to such a constitution, the power distributors 151 to 155, which are heat generating components, are arranged in a distributed manner, so that the concentration of heat generation in a partial area can be suppressed. As a result, the routing members thickened as a countermeasure against the heat generation can be made thinner.

Second Embodiment

Next, a second embodiment will be described. The second embodiment is different from the first embodiment in that at least a part of the high-voltage battery 120 is detachably attached to the electric power supplying module 100. Note that the constitutions except for those to be described below are the same as the constitutions in the first embodiment.

Figure 8:
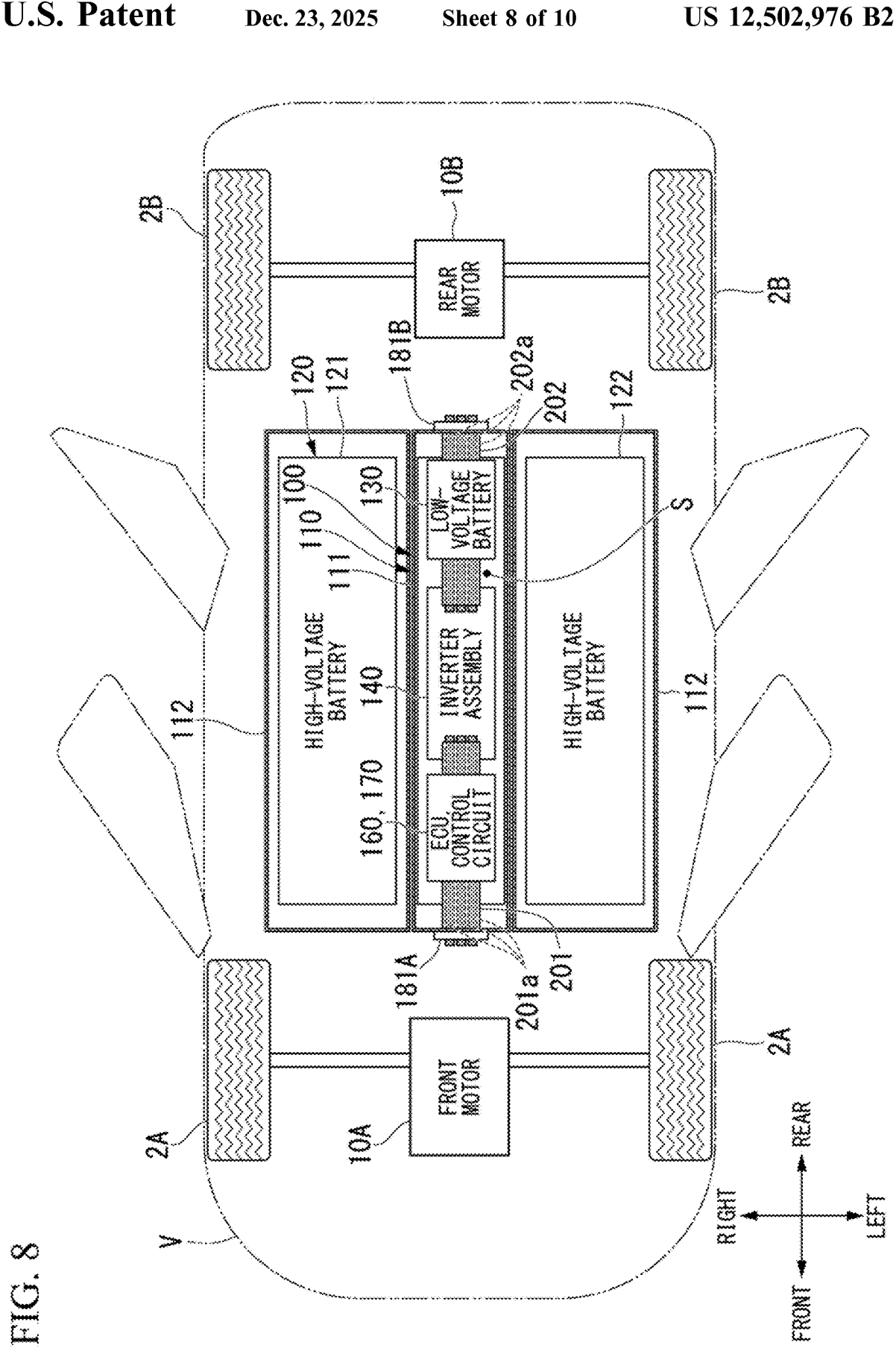
FIG. 8 is a cross-sectional view illustrating an arrangement example in an electric power supplying module in a second embodiment.

FIG. 8 is a diagram illustrating a constitution example of the electric power supplying module 100 in the second embodiment. In the present embodiment, the low-voltage battery 130, the inverter assembly 140, the power distribution unit 150, the ECU unit 160, and the control device 170 are housed in the case 111.

On the other hand, the first battery unit 121 and the second battery unit 122 are each housed in a case 112. The case 112, in which the first battery unit 121 or the second battery unit 122 is housed, is detachably attached to the electric power supplying module 100. When the remaining capacity of the first battery unit 121 or the second battery unit 122 becomes little, the first battery unit 121 or the second battery unit 122 is detached together with the case 112 from the electric power supplying module 100. Then, the first battery unit 121 or the second battery unit 122, which has been charged, is attached together with the case 112 to the electric power supplying module 100. Also in such a constitution, the lengths of the routing members can be shortened.

Third Embodiment

Next, a third embodiment will be described. The third embodiment is different from the first embodiment in that the module base 110 is formed of a plurality of cases 301 and 302. Note that the constitutions except for those to be described below are the same as the constitutions in the first embodiment.

Figure 9:
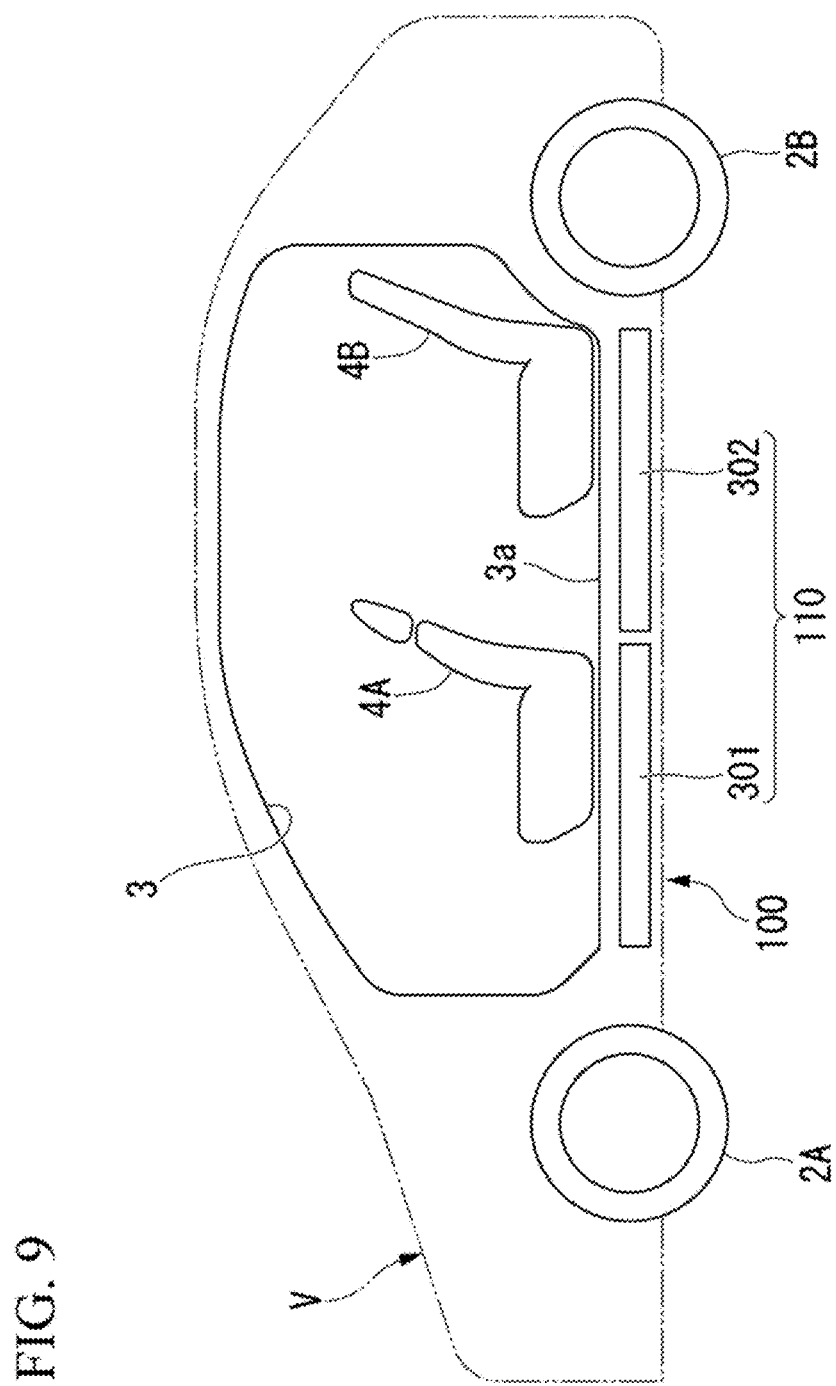
FIG. 9 is a side view showing an electric power supplying module in a third embodiment.

FIG. 9 is a side view showing the electric power supplying module 100 in the third embodiment. As illustrated in FIG. 9, in the present embodiment, the module base 110 is formed of the plurality of cases 301 and 302. The plurality of cases 301 and 302 are disposed under the floor of the vehicle V, for example, side by side in the horizontal direction.

In the present embodiment, the high-voltage battery 120, the low-voltage battery 130, the DC-DC converter 141, the motor inverter 142, the heat pump inverter 143, the charger converter 144, the power distribution unit 150, the ECU unit 160, and the control device 170 are separately housed in the plurality of cases 301 and 302. Also in such a constitution, the lengths of the routing members can be shortened.

Fourth Embodiment

Next, a fourth embodiment will be described. The fourth embodiment is different from the first embodiment in that the module base 110 is formed of base members 401 and 402. Note that the constitutions except for those to be described below are the same as the constitutions in the first embodiment.

Figure 10:
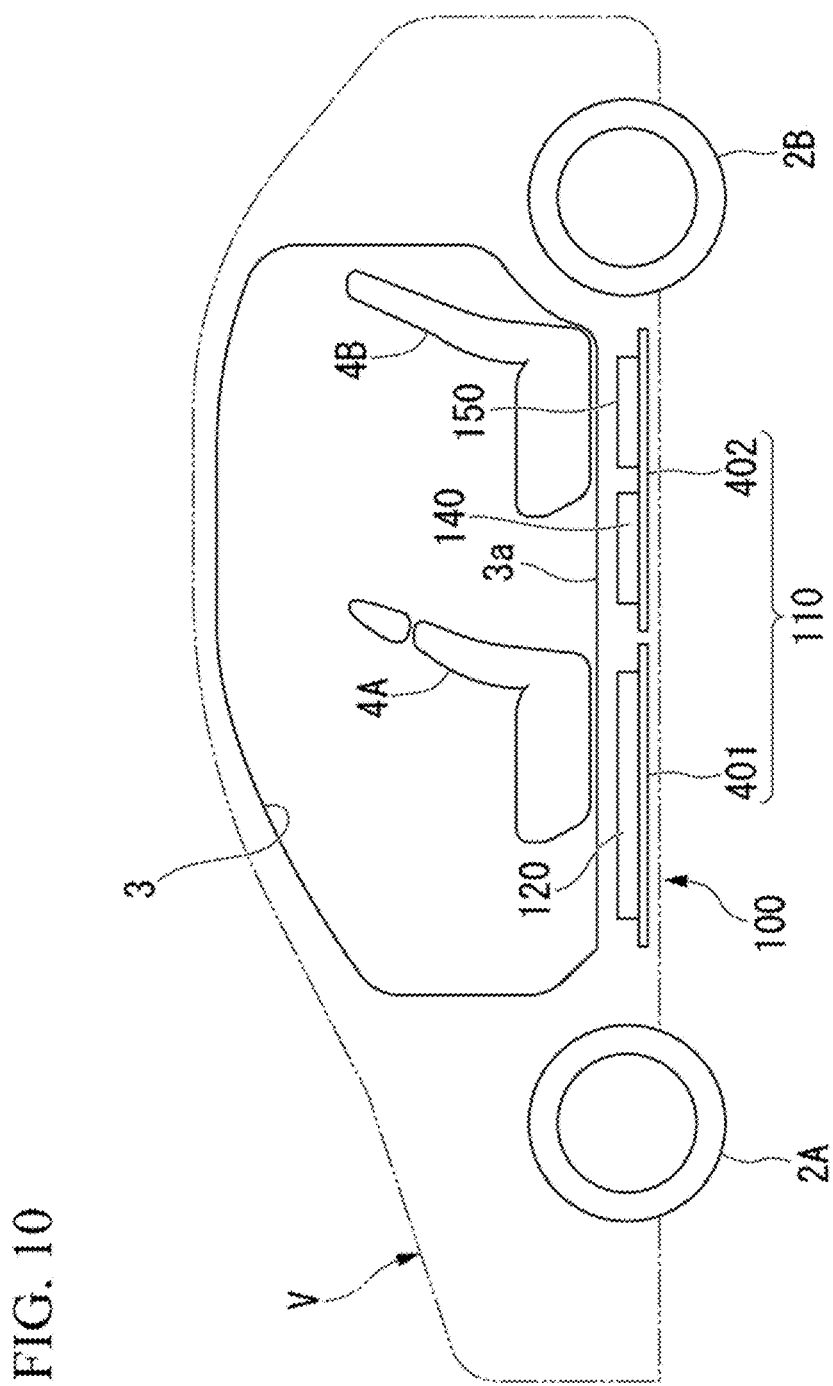
FIG. 10 is a side view showing an electric power supplying module in a fourth embodiment.

FIG. 10 is a side view showing the electric power supplying module 100 in the fourth embodiment. As illustrated in FIG. 10, in the present embodiment, the module base 110 is formed of one or more (for example, a plurality of) base members 401 and 402. Each of the base members 401 and 402 is a plate-shaped member. Each of the base members 401 and 402 may be a plate member made of metal or synthetic resin, a substrate on which an electric circuit is formed, or the like. The base members 401 and 402 are disposed under the floor of the vehicle V, for example, side by side in the horizontal direction.

The high-voltage battery 120, the low-voltage battery 130, the DC-DC converter 141, the motor inverter 142, the heat pump inverter 143, the charger converter 144, the power distribution unit 150, the ECU unit 160, and the control device 170 are mounted on the above one or more (for example, a plurality of) base members 401 and 402. Also in such a constitution, the lengths of the routing members can be shortened.

Heretofore, some embodiments have been described. However, the embodiments are not limited to the above-described examples. For example, some of the above-described embodiments may be implemented in combination with each other.

<Supplementary Note>

In the following, some supplementary notes of the electric power supplying modules will be given.

[1]

An electric power supplying module includes:
  a module base (for example, the module base 110) disposed under a floor of a vehicle;
  a power conversion unit (for example, the inverter assembly 140, the DC-DC converter 141, or the motor inverter 142) supported by the module base and configured to convert power supplied from a battery (for example, the high-voltage battery 120);
  a first connector (for example, any one of the high-voltage connectors 181A, 181B, 182, and 183 and the low-voltage connectors 191L, 191R, 192, 193L, 193R, 194, 195L, and 195R) supported by the module base and connectable with a first routing member (for example, the routing member 200) that supplies first power output from the power conversion unit to a first load unit (for example, any one of the front motor 10A, the rear motor 10B, the heat pump 21, the left-front auxiliary equipment 22L, the right-front auxiliary equipment 22R, the panel auxiliary equipment 23, the first to fourth door auxiliary equipment 31AL, 31BL, 31AR, and 31BR, the first and second floor auxiliary equipment 32FA and 32FB, the left-rear auxiliary equipment 42L, and the right-rear auxiliary equipment 42R) of the vehicle; and
  a second connector (for example, any one of the high-voltage connectors 181A, 181B, 182, and 183 and the low-voltage connectors 191L, 191R, 192, 193L, 193R, 194, 195L, and 195R) supported by the module base and connectable with a second routing member (for example, the routing member 200) that supplies second power output from the power conversion unit to a second load unit (for example, any one of the front motor 10A, the rear motor 10B, the heat pump 21, the left-front auxiliary equipment 22L, the right-front auxiliary equipment 22R, the panel auxiliary equipment 23, the first to fourth door auxiliary equipment 31AL, 31BL, 31AR, 31BR, the first and second floor auxiliary equipment 32FA and 32FB, the left-rear auxiliary equipment 42L, and the right-rear auxiliary equipment 42R) of the vehicle.

Note that the first power and the second power may have the same voltages, or may have different voltages. In addition, the first power and the second power both may be DC power, or both may be AC power.

According to the constitution of the above [1], the length of the first routing member can be shortened to a length that connects the first load unit with the first connector disposed under the floor of the vehicle. In addition, the length of the second routing member can be shortened to a length that connects the second load unit with the second connector disposed under the floor of the vehicle. Therefore, the lengths of the routing members can be shortened.

[2]. In the electric power supplying module described in [1],
  the module base includes a housing (for example, the case 111) disposed under the floor of the vehicle, the battery and the power conversion unit are housed in the housing, and the first connector and the second connector are supported by the housing.

According to the constitution of the above [2], the battery and the power conversion unit are housed in one housing. Therefore, the battery and the power conversion unit can be disposed to be close to each other under the floor of the vehicle, as compared with a case where the battery and the power conversion unit are housed in different housings. It becomes possible to simplify the constitution of the electric connection member between the battery and the power conversion unit, because the battery and the power conversion unit can be disposed to be close to each other. By making it possible to simplify the constitution of the electric connection member, the power supply module can be easily downsized.

[3]. In the electric power supplying module described in [1] or [2],
  the power conversion unit includes: a first power conversion device (for example, the DC-DC converter 141) configured to convert the power supplied from the battery into the first power that is DC power; and a second power conversion device (for example, the motor inverter 142 or the heat pump inverter 143) configured to convert the power supplied from the battery into the second power that is AC power, the first connector is a connector corresponding to the DC power, and the second connector is a connector corresponding to the AC power.

According to the constitution of above [3], the lengths of the routing members can be shortened in both the routing member connected with a supply destination of the DC power and the routing member connected with a supply destination of the AC power.

[4]. In the electric power supplying module described in [1] or [2],
  when the vehicle is viewed from above, the module base includes: a front-end portion (for example, the front-end portion 110a) disposed between a center in a front-rear direction of the vehicle and a front end of the vehicle; and a rear-end portion (for example, the rear-end portion 110b) disposed between the center in the front-rear direction of the vehicle and a rear end of the vehicle, the first connector is disposed at the front-end portion, and the second connector is disposed at the rear-end portion.

According to the constitution of the above [4], the first connector and the second connector are respectively disposed separately at both end portions in the front-rear direction of the module base, and thus the lengths of the first routing member and the second routing member can be further shortened.

[5]. In the electric power supplying module described in one of [1] to [4], when the vehicle is viewed from above, the module base includes: a left-end portion (for example, the left-end portion 110c) disposed between a center in a width direction of the vehicle and a left end of the vehicle; and a right-end portion (for example, the right-end portion 110d) disposed between the center in the width direction of the vehicle and a right end of the vehicle, the first connector is disposed at the left-end portion, and the second connector is disposed at the right-end portion.

According to the constitution of the above [5], the first connector and the second connector are respectively disposed separately at both end portions in the left-right direction of the module base, and thus the lengths of the first routing member and the second routing member can be further shortened.

[6]. The electric power supplying module described in one of [1] to [5] further includes: a first battery (for example, the high-voltage battery 120) that is the battery; and a second battery (for example, the low-voltage battery 130) lower in supply voltage than the first battery, in which the first battery and the second battery are supported by the module base.

According to the constitution of the above [6], for example, the length of the routing member for the second battery can be shortened, as compared with a case where the second battery is disposed in either the front section or the rear section of the vehicle.

[7]. The electric power supplying module described in one of [1] to [6] further includes a power distributor (any one of the power distributors 151 to 155) supported by the module base and configured to distribute power output from the power conversion unit, in which the first load unit includes a plurality of loads, and the first connector is connectable with the first routing member that supplies the power distributed by the power distributor to the plurality of loads.

According to the constitution of the above [7], the length of the first routing member that supplies the power to the plurality of loads can be shortened.

[8]

An electric power supplying module includes:
a module base (for example, the module base 110) disposed under a floor of a vehicle;
a power conversion unit (for example, the DC-DC converter 141) supported by the module base and configured to convert power supplied from a battery;
a power distributor (for example, any one of the power distributors 151 to 155) supported by the module base and configured to distribute the power output from the power conversion unit; and
a connector (for example, any one of the low-voltage connectors 191L, 191R, 192, 193L, 193R, 194, 195L, and 195R) supported by the module base and connectable with a routing member that supplies the power distributed by the power distributor to a plurality of loads of the vehicle.

According to the constitution of the above [8], the length of the routing member that supplies the power to the plurality of loads can be shortened to a length that connects the plurality of loads with the connector disposed under the floor of the vehicle.

INDUSTRIAL APPLICABILITY

According to the electric power supplying module in the present invention, the lengths of the routing members can be shortened.

BRIEF DESCRIPTION OF THE REFERENCE SYMBOLS

1 Electric power supplying system
10A Front motor
10B Rear motor
21 Heat pump
22, 22R, 22L Front auxiliary equipment
23 Panel auxiliary equipment
31, 31AL, 31BL, 31AR, 31BR Door auxiliary equipment
32, 32FA, 32FB Floor auxiliary equipment
41 Charging port
42, 42L, 42R Rear auxiliary equipment
100 Electric power supplying module
110 Module base
111 Case
120 High-voltage battery
130 Low-voltage battery
140 Inverter assembly
141 DC-DC converter
142 Motor inverter
143 Heat pump inverter
144 Charger converter
150 Power distribution unit
151, 152, 153, 154, 155 Power distributor
181, 182, 183 High-voltage connector
191, 192, 193, 194, 195 Low-voltage connector

What is claimed is:

1. An electric power supplying module comprising:
a module base disposed under a floor of a vehicle;
a power conversion unit supported by the module base and configured to convert power supplied from a battery;
a housing in which the power conversion unit is housed;
a first connector supported by the module base and connectable with a first routing member that supplies first power output from the power conversion unit to a first load unit of the vehicle; and
a second connector supported by the module base and connectable with a second routing member that supplies second power output from the power conversion unit to a second load unit of the vehicle,
wherein the power conversion unit comprises, within the housing, a first set of first bus bars and a second set of second bus bars, the first set of first bus bars is collectively surrounded by a first protection member and is extended within the housing from the power conversion unit to a first inner edge of the housing, and
wherein the first connector is electrically connected to one of the first bus bars by a connector bus bar of the first connector that is overlapping and is physically connected, at the first inner edge of the housing, to the one of the first plurality of bus bars through the first protection member.

2. The electric power supplying module according to claim 1, wherein
the module base includes the housing as disposed under the floor of the vehicle,
the battery and the power conversion unit are housed in the housing, and
the first connector and the second connector are supported by the housing.

3. The electric power supplying module according to claim 1, wherein
the power conversion unit includes: a first power conversion device configured to convert the power supplied from the battery into the first power that is DC power; and a second power conversion device configured to convert the power supplied from the battery into the second power that is AC power,
the first connector is a connector corresponding to the DC power, and
the second connector is a connector corresponding to the AC power.

4. The electric power supplying module according to claim 1, wherein
when the vehicle is viewed from above, the module base includes: a front-end portion disposed between a center in a front-rear direction of the vehicle and a front end of the vehicle; and a rear-end portion disposed between the center in the front-rear direction of the vehicle and a rear end of the vehicle,
the first connector is disposed at the front-end portion, and the second connector is disposed at the rear-end portion.

5. The electric power supplying module according to claim 1, wherein
when the vehicle is viewed from above, the module base includes: a left-end portion disposed between a center in a width direction of the vehicle and a left end of the vehicle; and a right-end portion disposed between the center in the width direction of the vehicle and a right end of the vehicle,
the first connector is disposed at the left-end portion, and the second connector is disposed at the right-end portion.

6. The electric power supplying module according to claim 1, further comprising:
a first battery that is the battery; and
a second battery lower in supply voltage than the first battery, wherein
the first battery and the second battery are supported by the module base.

7. The electric power supplying module according to claim 1, further comprising
a power distributor supported by the module base and configured to distribute power output from the power conversion unit, wherein
the first load unit includes a plurality of loads, and
the first connector is connectable with the first routing member that supplies the power distributed by the power distributor to the plurality of loads.

8. An electric power supplying module comprising:
a module base disposed under a floor of a vehicle;
a power conversion unit supported by the module base and configured to convert power supplied from a battery;
a housing in which the power conversion unit is housed;
a power distributor supported by the module base and configured to distribute the power output from the power conversion unit; and
a connector supported by the module base and connectable with a routing member that supplies the power distributed by the power distributor to a plurality of loads of the vehicle,
wherein the power conversion unit comprises, within the housing, a first set of first bus bars and a second set of second bus bars, the first set of first bus bars is collectively surrounded by a first protection member and is extended within the housing from the power conversion unit to a first inner edge of the housing, and
wherein the connector is electrically connected to one of the first bus bars by a connector bus bar of the connector that is overlapping and is physically connected, at the first inner edge of the housing, to the one of the first plurality of bus bars through the first protection member.

9. The electric power supplying module according to claim 1, wherein the second set of second bus bars is collectively surrounded by a second protection member and is extended within the housing from the power conversion unit to a second inner edge of the housing, the first inner edge and the second inner edge being different inner edges of the housing, and
wherein the second connector is electrically connected to one of the second bus bars by a connector bus bar of the second connector that is overlapping and is physically connected, at the second inner edge of the housing, to the one of the second plurality of bus bars through the second protection member.

10. The electric power supplying module according to claim 9, further comprising:
a third connector supported by the module base and connectable with a third routing member that supplies third power output from the power conversion unit to a third load unit of the vehicle; and
a fourth connector supported by the module base and connectable with a fourth routing member that supplies second power output from the power conversion unit to a fourth load unit of the vehicle,
wherein the power conversion unit comprises, within the housing, a third set of third bus bars and a fourth set of fourth bus bars, the third set of third bus bars is collectively surrounded by a third protection member and is extended within the housing from the power conversion unit to a third inner edge of the housing,
wherein the third connector is electrically connected to one of the third bus bars by a connector bus bar of the third connector that is overlapping and is physically connected, at the third inner edge of the housing, to the one of the third plurality of bus bars through the third protection member,
wherein the housing comprises a rectangular perimeter and each of the first inner edge, the second inner edge, and the third inner edge of the housing are respectively different edges of a rectangular perimeter of the housing.

11. The electric power supplying module according to claim 10, wherein the fourth set of fourth bus bars is collectively surrounded by a fourth protection member and is extended within the housing, to a fourth edge of the housing, and partly overlapping at least one of the first set of first bus bars, second set of second bus bars, and third set of third bus bars,
the fourth inner edge of the housing being a different edge of the rectangular perimeter than each of the first inner edge, the second inner edge, and the third inner edge,
the fourth connector is electrically connected to one of the fourth bus bars by a connector bus bar of the fourth connector that is overlapping and is physically connected, at the fourth inner edge of the housing, to the one of the fourth plurality of bus bars through the fourth protection member, and
each of the first routing member, the second routing member, the third routing member, and the fourth routing member are extended, outside of the housing, from respectively different ones of outer edges of the rectangular perimeter of the housing.

* * * * *